March 3, 1964  P. A. COLLIER  3,122,855
FISHING TACKLE RACK AND BOX
Filed May 11, 1962  2 Sheets-Sheet 1

PAUL COLLIER
INVENTOR.

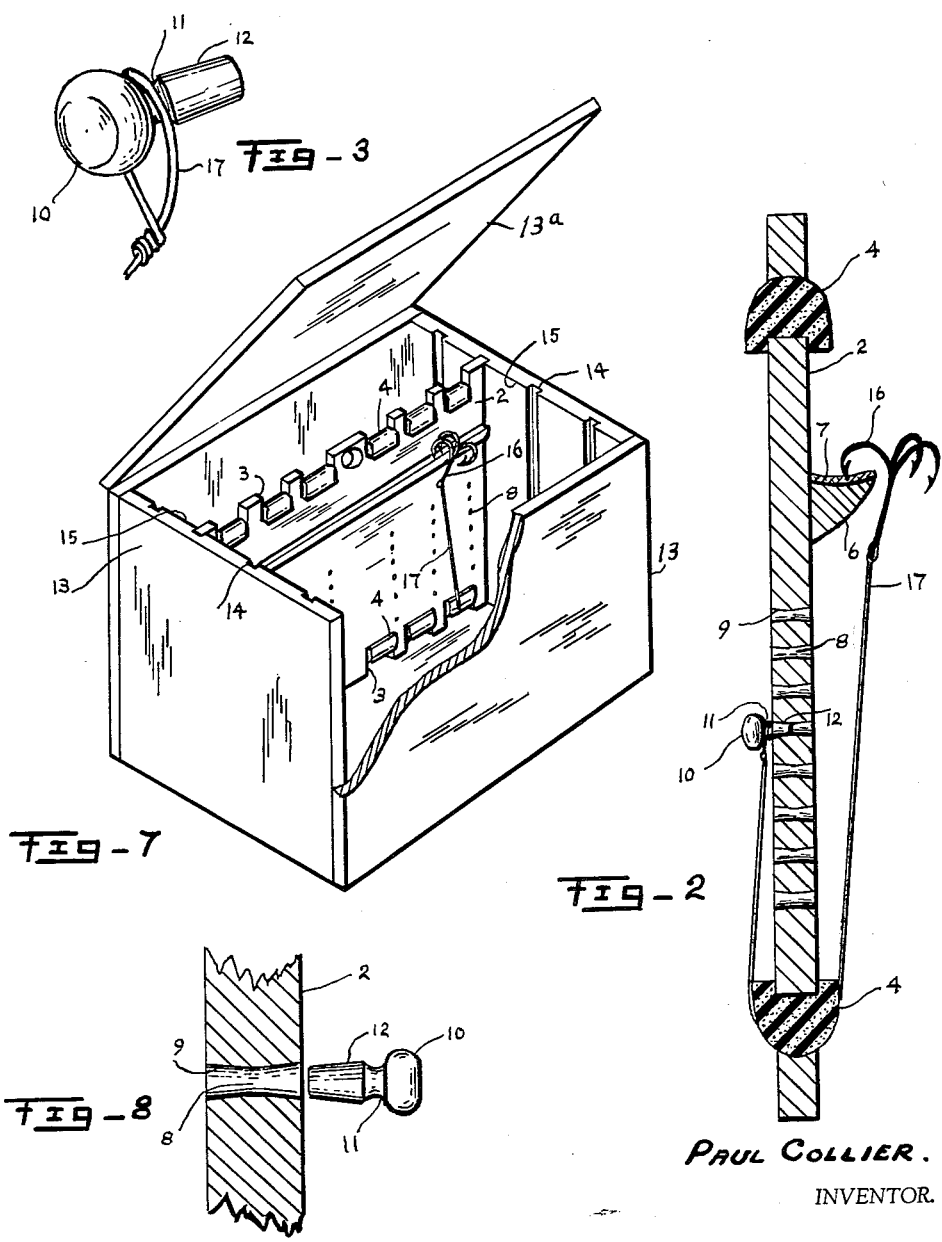

United States Patent Office 3,122,855
Patented Mar. 3, 1964

3,122,855
FISHING TACKLE RACK AND BOX
Paul A. Collier, Com Phib Pac Flag Allowance,
U.S. Naval Amphibious Base, Coronado, Calif.
Filed May 11, 1962, Ser. No. 194,039
1 Claim. (Cl. 43—57.5)

This invention relates to fishing tackle racks and boxes and more particularly an object of the invention is the provision of a simple and inexpensive means of racking and storing multiple fish hooks when attached to leaders used in fishing gear. All reference to multiple fish hooks in relation to the present invention being understood to mean two or more clustered hooks on a common hook shank having an eyelet or other means for attaching same to a leader line.

Heretofore such devices have been designed for a tackle rack using single hooks or flies and the fisherman using long leaders with triple or double hooks has been beset with the difficulties of tangled leaders and the chance of sustaining an injury from exposed barbs in multiple hooks. With the present invention fish hooks and leaders may be quickly secured on a rack and placed in the accompanying tackle box and the removal thereof being easily accomplished without danger of injury from exposed barbs of said hooks.

Therefore, the object of the invention is to provide a rack for fish hooks of various types and sizes having leaders of varying length attached thereto.

Another object of the invention is to provide a box in which several racks may be placed for convenient carrying or storage.

A further object of the invention is to provide a box from which racks may be easily removed without danger to the hands of the user.

A still further object of the invention is to provide a tackle box in which several racks may be placed in such manner that the hooks on one rack cannot come in contact with those on the adjoining rack.

Another object of the invention is to provide a rack on which hooks and leaders may be secured and held taut without the use of springs.

Another object of the invention is to provide a rack having selective means of adjusting the tension on leaders secured thereon.

Other objects of the invention will become apparent from the following detailed description taken in connection with the accompanying drawings, and it is to be understood however, that the drawings are employed merely for the purpose of illustration only. Reference is now had to the accompanying drawings in which the similar reference characters denote the same parts.

In the drawings:

FIGURE 2 shows a vertical view in cross section taken along line 2—2 of FIGURE 1.

FIGURE 3 is an enlarged perspective view of a taper pin showing a loop end of leader line secured in position.

FIGURE 7 is a partly fragmentary and perspective view of a tackle box showing one rack in position.

FIGURE 8 shows a fragmentary and vertically sectional view of the rack disclosing the tapered holes therein and in relation to the taper pin used therein.

Figure 1:
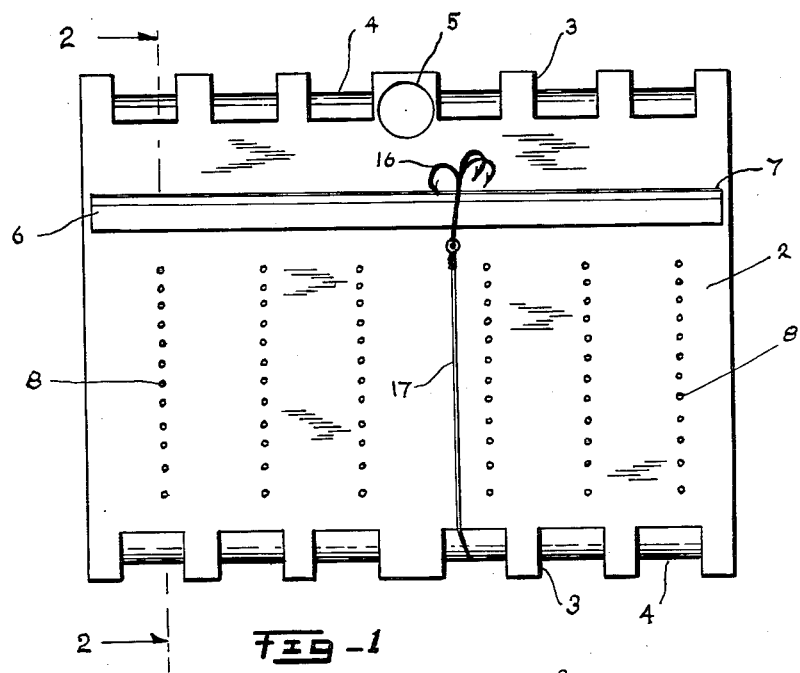
FIGURE 1 is a front elevational view of the preferred embodiment of the present invention showing the mounting of leader line with multiple hook secured thereon.
Figures 4, 5:
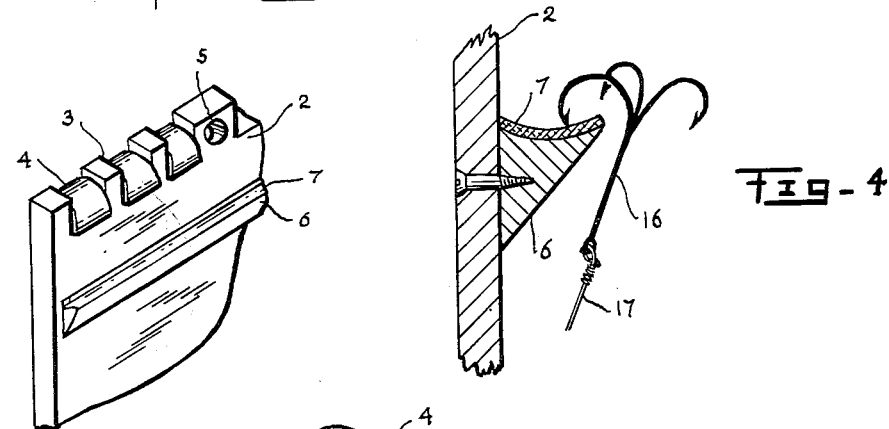
FIGURE 4 shows an enlarged cross section of a portion of the rack showing a hook attaching concave channel.
FIGURE 5 shows a fragmentary perspective view of a portion of said rack.
Figure 6:
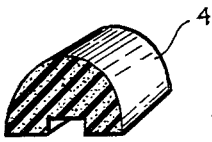
FIGURE 6 is a perspective view of a soft rubber insert.

Referring in detail to the drawings with particular reference to FIGURE 1 wherein the preferred embodiment of the invention is shown, said invention comprises a board or rack 2 which may be made of wood, plastic or other material, said rack 2 comprises a rectangular main body portion having cut out portions 3 at the top and bottom edges thereto. Said cut out portions 3 are provided with inserts 4 of suitable configuration, which are made of sponge, soft rubber or similar resilient material. Also, said rack 2 at the top center section and between said cut out portions 3 is provided with a finger hole 5, the purpose of which will be presently described. A hook channel 6 is provided with a longitudinal concave surface and is secured to and projects laterally from the front face of said rack 2 and which in preferred position, said channel 6 is positioned parallel to the upper edge thereof. Also, said hook channel 6 in structure is shorter as compared with the length of said rack 2 and is centrally mounted thereon (see FIG. 1), so that when in position said hook channel 6 will extend longitudinally and across the central face section of said rack 2, thus exposing the rack ends, as shown. A layer of facing 7 made out of cork or similar material is secured to the upper and longitudinally concave surface of said hook channel 6. Said rack 2 is provided with a plurality of equally spaced holes 8 which are disposed in rows and extend downwardly from said hook channel 6. The holes pass entirely through the body of said rack 2 and each hole is provided with a slightly conical inner surface for forming tapered hole 9 extending inwardly from each surface and terminating approximately at the center of the body portion thereof. Each of the aforesaid rows of said holes 8 are arranged in a vertical line which are disposed substantially to one side of the vertical center line of said aforementioned cut out portions 3 for securing accessibility thereto when in use. A plurality of pins 10 are provided for said holes 8, each of said pins 10 having a suitably enlarged head and a circumferential undercut 11 including an elongated taper body portion 12, said taper body portion 12 being arranged to fit said tapered hole surfaces 9. As shown in FIG. 2, a multiple hook 16 provided with a leader line 17 and extending from the hook shank thereof is disclosed in its mounted position on said rack 2, and is secured in such position by means of said pin 10 having the leader line loop engaging said undercut 11. And as shown in FIG. 7, a box 13 of substantially rectangular form provided with a suitable closure 13ª is employed, said box 13 having a plurality of vertical slots 14 which are disposed on opposing inner surfaces 15 thereof, said slots 14 being of width and depth sufficient to receive the extending edges of said rack 2 for securing sliding position therein.

In using the above described tackle rack 2 and box 13 said hook 16 with leader 17 attached is placed on the hook channel 6 wherein the point of said hook is embedded in the cork facing 7 and allowing the leader line 17 attached to said hook to be brought down and over the soft rubber insert 4, thereby allowing said leader line 17 to be carried to and fastened upon the opposite surface side of said rack 2. The extending loop of said leader line 17 is held in engaging position by means of said undercut 11 secured on said taper pin 10, which is then pulled taut and the tapered body of said pin 10 with leader loop attached is placed in the nearest taper hole 8, and obviously, it will be noted, that extra long leaders may be continued to be looped over the upper soft rubber inserts 4 and secured in similar manner with said pins 10 in the nearest corresponding hole 8 on the respective face of said rack 2. When in use, said finger hole 5 disposed at the top center section of said rack 2 makes it possible to lift and carry said rack for placing same in a desired position in said tackle box 13. It may be noted that when one or more of said racks 2 are in position in said tackle box 13, each row of hooks 16 is held apart and separated from the adjacent row of hooks, so that when in use the hand of the user need not be placed near said hooks and become injured thereby.

The foregoing is considered as descriptive and by way of illustration and example only of the principles of the invention and since modifications and changes will readily occur to those skilled in the art, it is desired not to limit the invention to the exact construction and operation shown and described, and accordingly all suitable modifications and equivalents may be resorted to that may come within the scope of the appended claim.

Having thus completely and fully described the invention, what is now claimed as new is as follows:

A holder as described for single or multiple fishing hooks having leaders attached thereto comprising a body plate member having a lifting hole at the top center thereof, there being a plurality of aligned cut out portions along the top and bottom edges of said body plate member, said cut out portions having soft rubber inserts placed therein over which leaders may be wound, a channel member affixed to said body plate member, said channel member being disposed longitudinally approximately midway between the horizontal center line and upper edge of said body plate member, said channel member being faced on the upper surface thereof with cork or similar material for receiving hook points, there being a plurality of small holes passing through the aforesaid body plate member, said holes being provided with a slight inward taper from the outer faces of said body plate member and arranged in close proximity to each other, said holes being disposed in rows and vertically on a line to one side of the vertical center line between top and bottom pairs of the aforementioned cut out portions and extending downwardly between the aforesaid channel member and lower cut out portions, a plurality of pins for association with the aforesaid holes, said pins being provided with a head and a stem portion, said stem portion having a slight taper arranged to fit in the aforesaid taper holes, there being a groove behind the head of said pins for association with a loop end of fishing hook leader, and a box of substantially rectangular form having a top closure member, said box having two or more slots disposed vertically on two opposite inner faces thereof, said slots on one inner face being in direct alignment with slots on the opposite inner face, and also being adapted to receive the aforesaid body plate member in sliding relation therein, and the aforesaid box being adapted to receive one or more of said body plate members nested within and covered by the aforesaid closure member.

References Cited in the file of this patent

UNITED STATES PATENTS

| | | |
|---|---|---|
| 2,553,097 | Lampe | May 15, 1951 |
| 2,595,463 | Kamps | May 6, 1952 |
| 2,711,050 | McIntyre | June 21, 1955 |
| 2,791,863 | Sweeney | May 14, 1957 |

FOREIGN PATENTS

| | | |
|---|---|---|
| 1,043,253 | France | Dec. 29, 1954 |
| | (1st ADD. to No. 62,162) | |
| 18,554 | Great Britain | of 1913 |
| 214,386 | Great Britain | Apr. 24, 1924 |
| 63,949 | Norway | Sept. 22, 1941 |
| 73,167 | Norway | June 11, 1951 |